United States Patent
Kusano

(10) Patent No.: US 7,331,641 B2
(45) Date of Patent: Feb. 19, 2008

(54) BRAKING STROKE SIMULATOR

(75) Inventor: Akihito Kusano, Toyota (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 0 days.

(21) Appl. No.: 10/840,627

(22) Filed: May 7, 2004

(65) Prior Publication Data

US 2005/0001476 A1    Jan. 6, 2005

(30) Foreign Application Priority Data

May 14, 2003    (JP)    ............................. 2003-135981

(51) Int. Cl.
*B60T 11/00*    (2006.01)
(52) U.S. Cl. .................................. 303/114.1; 188/359
(58) Field of Classification Search ........ 188/348–358; 303/114.1; 60/545–589; 91/369.2
See application file for complete search history.

(56) References Cited

U.S. PATENT DOCUMENTS

| | | | | |
|---|---|---|---|---|
| 2,117,433 A | * | 5/1938 | Krebs | 123/90.66 |
| 4,126,996 A | * | 11/1978 | Leiber | 60/547.1 |
| 4,166,655 A | * | 9/1979 | Spero | 303/87 |
| 4,220,376 A | * | 9/1980 | Spero | 303/87 |
| 4,242,943 A | * | 1/1981 | Nakamura et al. | 91/369.2 |
| 4,245,826 A | * | 1/1981 | Wirges | 267/131 |
| 4,603,918 A | * | 8/1986 | Leiber et al. | 303/9.75 |
| 4,643,075 A | * | 2/1987 | Wagner | 91/369.2 |
| 5,036,665 A | * | 8/1991 | Brown, Jr. | 60/550 |
| 5,263,398 A | * | 11/1993 | Kobayashi et al. | 91/369.2 |
| 5,907,990 A | * | 6/1999 | Satoh | 91/369.2 |
| 6,033,036 A | * | 3/2000 | Ruffer et al. | 303/114.1 |
| 6,058,705 A | | 5/2000 | Schunck | |
| 6,135,575 A | * | 10/2000 | Feigel et al. | 303/113.4 |
| 6,290,310 B1 | * | 9/2001 | Kusano | 303/122.11 |
| 6,422,661 B1 | * | 7/2002 | Shaw et al. | 303/114.1 |
| 6,709,072 B2 | * | 3/2004 | Kusano et al. | 303/113.4 |
| 2002/0140286 A1 | * | 10/2002 | Ishimura et al. | 303/155 |
| 2002/0153215 A1 | * | 10/2002 | Kusano et al. | 188/355 |
| 2003/0020328 A1 | * | 1/2003 | Kusano et al. | 303/114.1 |
| 2003/0071518 A1 | * | 4/2003 | Kusano et al. | 303/114.1 |

FOREIGN PATENT DOCUMENTS

| | | |
|---|---|---|
| EP | 0 771 705 B1 | 5/1997 |
| JP | 10-167042 | 6/1998 |

* cited by examiner

*Primary Examiner*—Christopher P. Schwartz
(74) *Attorney, Agent, or Firm*—Buchanan Ingersoll & Rooney PC

(57) ABSTRACT

The present invention is directed to a braking stroke simulator for use in a brake system, which comprises a simulator piston moved in response to operation of a manually operated braking member, and an elastic element for providing a stroke to the simulator piston in response to braking operation force applied to the manually operated braking member, wherein restoring amount of the elastic element is restricted to set an initial load to be applied thereto. The elastic element includes a first elastic member made of rubber, and a second elastic member made of a helical spring, which is disposed in series with the first elastic member. The initial load applied to the first elastic member and the initial load applied to the second elastic member are set to be substantially equal to each other.

17 Claims, 4 Drawing Sheets

BRAKING STROKE SIMULATOR

This application claims priority under 35 U.S.C. Sec. 119 to No.2003-135981 filed in Japan on May 14, 2003, the entire content of which is herein incorporated by reference.

BACKGROUND OF THE INVENTION

1. Field of the Invention

The present invention relates to a braking stroke simulator for use in a hydraulic brake system of a vehicle, and more particularly to a braking stroke simulator operated in response to operation of a manually operated braking member.

2. Description of the Related Arts

Heretofore, there is known various hydraulic brake systems, including such a system as constituted by a hydraulic pressure control device having a pressure source for regulating hydraulic pressure discharged from the pressure source in response to operation of the manually operated braking member, to supply it into wheel brake cylinders. And, a braking stroke simulator is disposed to provide a stroke of the manually operated braking member in response to the braking operation force applied thereto.

In Japanese Patent Laid-open publication No.10-167042, which corresponds to U.S. Pat. No. 6,058,705, for example, a lengthened idle travel of pistons of a master cylinder is proposed for a hydraulic brake system, wherein a travel-dependent force is realized with simulator spring elements that act upon the pistons. For example, a compression spring is provided as a simulator spring element, and a dome-like elastomer body (rubber) is provided between a brake pedal and the pistons as another simulator spring element. It is described in the U.S. Pat. No. 6,058,705 that the elastomer body is inserted into a cylinder with initial tension (presumably meant by initial load applied to it), and the initial tension is selected to be so great that the elastomer body does not deform until a floating piston, acted upon by a stronger helical compression spring, has traversed nearly its entire idle travel.

With respect to a relationship between the braking operation force and the stroke of the manually operated braking member, it is desirable that the braking operation force required for increasing the amount of braking operation, i.e., depressing a brake pedal, is set to be greater than the braking operation force required for decreasing the amount of braking operation, i.e., restoring or releasing the brake pedal, to provide a so-called hysteresis property, which ensures a proper brake pedal feeling.

According to the hydraulic brake system as described above, when the travel of the manually operated braking member begins to produce its stroke by means of the simulator spring element made of elastomer body (rubber), the hysteris in the relationship between the braking operation force and the stroke of the manually operated braking member may be caused by the hysteresis of the elastically deformed rubber. However, when the travel of the master piston begins to produce its stroke by means of the simulator spring element made of the spring, almost no hysteresis is provided, so that the proper brake pedal feeling can not be ensured. In addition, as the initial load applied to the simulator spring element made of rubber is set independently, severe dimensional accuracy of the simulator spring element made of rubber is required for providing the initial load to be stable, which results in increase in cost. Furthermore, as the simulator spring element made of rubber is affected by aged deterioration, which will largely change the initial load applied to the simulator spring element, the brake pedal feeling as a whole might be deteriorated.

SUMMARY OF THE INVENTION

Accordingly, it is an object of the present invention to provide a braking stroke simulator used for a component of a hydraulic brake system for a vehicle, which is capable of providing a stable initial load to the simulator, with a little aged deterioration, and with a proper hysteresis, to ensure a proper brake pedal feeling.

In order to accomplish the above and other objects, the braking stroke simulator which is operated in response to operation of a manually operated braking member for use in a brake system, comprises a simulator piston which is moved in response to operation of a manually operated braking member, and an elastic element which provides a stroke to the simulator piston in response to braking operation force applied to the manually operated braking member, wherein restoring amount of the elastic element is restricted to set an initial load to be applied thereto. The elastic element includes a first elastic member made of rubber, and a second elastic member made of a helical spring, which is disposed in series with the first elastic member. The initial load applied to the first elastic member and the initial load applied to the second elastic member are set to be substantially equal to each other.

The braking stroke simulator may further comprise a housing for accommodating therein the first elastic member and second elastic member, with each restoring amount of them being restricted to set each initial load. Preferably, the second elastic member comprises a helical compression spring with a longitudinal axis thereof aligned with a longitudinal axis of the first elastic member. And, the braking stroke simulator may further include a floating piston movably disposed in the housing between the first elastic member and the second elastic member for transmitting the braking operation force.

The brake system may comprise a pressure generating device, which is provided with a piston moved in response to the manually operated braking member and a hydraulic pressure chamber defined in front of the piston, and which generates hydraulic pressure in the hydraulic pressure chamber to discharge the hydraulic pressure therefrom in response to the braking operation force applied to the manually operated braking member, with the piston being moved in response to the manually operated braking member. The elastic element provides the stroke to the simulator piston in response to the hydraulic pressure discharged from the pressure generating device.

The pressure generating device may be formed by a master cylinder having a master piston moved in response to the manually operated braking member, and a master pressure chamber defined in front of the master piston for discharging the hydraulic pressure in response to the braking operation force.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
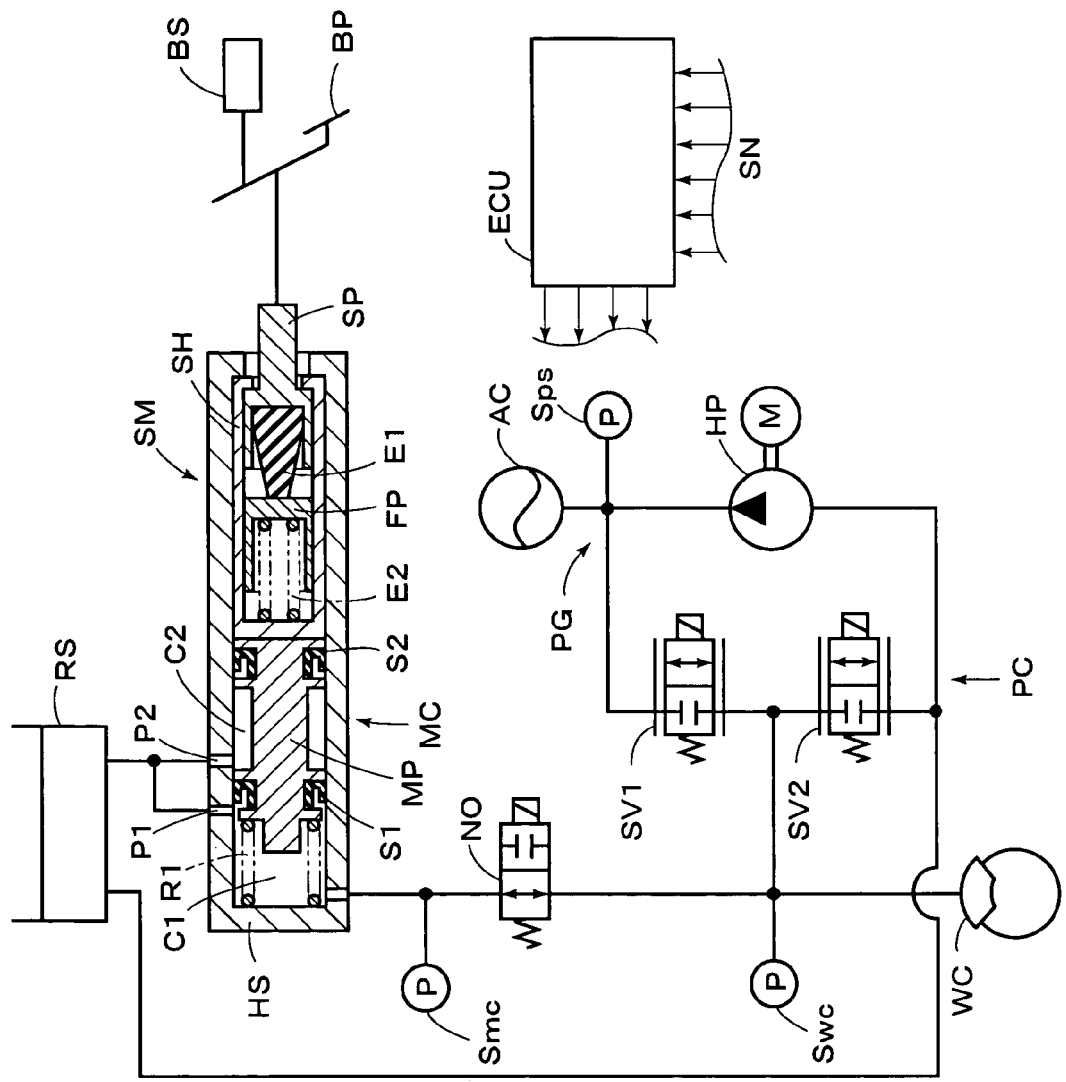
FIG. 1 is a schematic block diagram of a hydraulic brake system having a braking stroke simulator according to an embodiment of the present invention.

Referring to FIG. 1, there is illustrated a hydraulic brake system for a vehicle having a braking stroke simulator according to an embodiment of the present invention. A stroke simulator SM has a housing HS which accommodates a simulator piston SP moved in response to operation of a brake pedal BP, which is served as a manually operated braking member, and a first elastic member E1 and a second elastic member E2 for providing a stroke to the simulator piston SP in response to braking operation force. In the housing HS, a master piston MP and a return spring R1 are accommodated to constitute a master cylinder MC, which serves as a pressure generating device for generating hydraulic pressure in response to operation of the brake pedal BP, when a pressure control device PC as described later comes to be abnormal, to supply the hydraulic pressure into wheel brake cylinders (indicated by WC), each of which is operatively mounted on each wheel of the vehicle. And, a normally open electromagnetic switching valve NO is disposed between the master cylinder MC and the wheel brake cylinder WC. Furthermore, a pressure source PG for generating a certain hydraulic pressure irrespective of the braking operation of the vehicle driver is connected to a hydraulic passage between the switching valve NO and the wheel brake cylinder WC.

According to the present embodiment, the pressure source PG includes an electric motor M controlled by an electronic control unit ECU, and a hydraulic pressure pump HP, which is driven by the electric motor M, and whose inlet is connected to a reservoir under atmospheric pressure RS (hereinafter, simply referred to as a reservoir RS), and whose outlet is connected to an accumulator AC. According to the present embodiment, a pressure sensor Sps is connected to the outlet, and the detected pressure is monitored by the electronic control unit ECU. On the basis of the monitored result, the motor M is controlled by the electronic control unit ECU to keep the hydraulic pressure in the accumulator AC between predetermined upper and lower limits. The accumulator AC is connected to a hydraulic passage between the switching valve NO and the wheel brake cylinder WC, through a first linear solenoid valve SV1 of a normally closed type, to regulate the hydraulic pressure discharged from the pressure source PG and supply it to the wheel brake cylinder WC. Also, the reservoir RS is connected to the hydraulic passage between the switching valve NO and wheel brake cylinder WC, through a second linear solenoid valve SV2 of a normally closed type, to reduce the hydraulic pressure in the wheel brake cylinder WC and regulate it. Accordingly, the pressure control device PC is formed by the pressure source PG, first and second linear solenoid valves SV1 and SV2, electronic control unit ECU, and sensors as described hereinafter.

According to the present embodiment, a pressure sensor Smc is disposed in a hydraulic passage between the master cylinder MC and the switching valve NO, and a pressure sensor Swc is disposed in a hydraulic passage between the switching valve NO and the wheel brake cylinder WC. On the brake pedal BP, a stroke sensor BS is operatively connected to detect its stroke. The signals detected by the sensors as described above are fed to the electronic control unit ECU. Thus, the hydraulic pressure discharged from the master cylinder MC, the hydraulic pressure in the wheel brake cylinder WC and the stroke of the brake pedal BP are monitored by those sensors. Furthermore, in order to achieve those controls including an anti-lock control or the like, sensors SN such as wheel speed sensors, acceleration sensor or the like have been provided, so that the signals detected by them are fed to the electronic control unit ECU.

Figure 3:
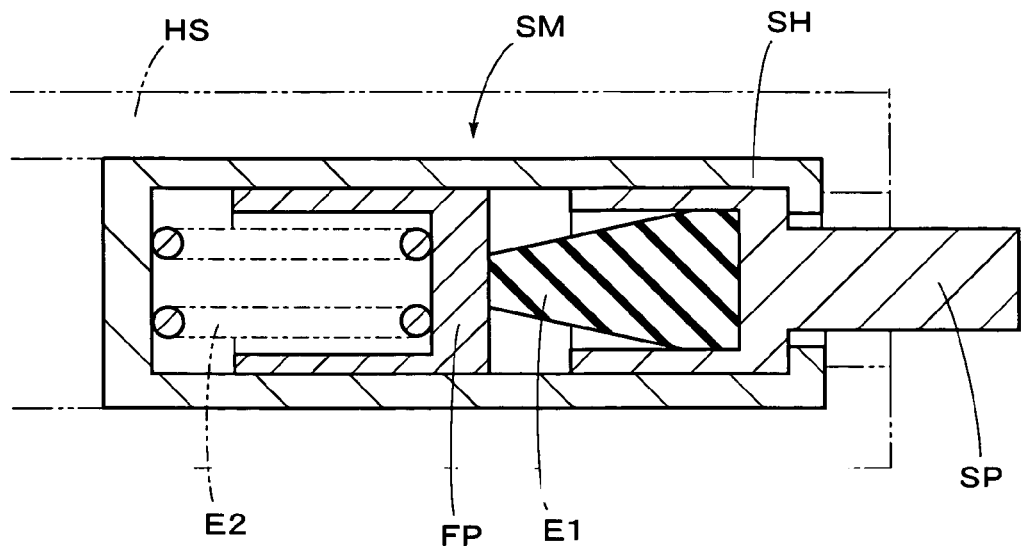
FIG. 3 is an enlarged sectional view of a braking stroke simulator according to an embodiment of the present invention.

As enlarged in FIG. 3, the stroke simulator SM in the present embodiment includes the simulator piston SP, the first elastic member E1 accommodated therein and made of rubber to be compressed by the braking operation force transmitted thereto through the simulator piston SP, a floating piston FP with the braking operation force transmitted thereto through the first elastic member E1, and a second elastic member E2 accommodated therein and made of a helical compression spring compressed by the braking operation force transmitted thereto through the floating piston FP, all of which are accommodated in the housing SH, and longitudinal axes of which are aligned. With the first elastic member E1 and second elastic member E2 accommodated in the housing SH, each restoring amount (expansion length) is restricted, and each initial load is set to be substantially the same load. In this embodiment, the spring constant of the second elastic member E2 is set to be smaller than the spring constant of the first elastic member E1.

According to the present embodiment, the master cylinder MC is formed in a body with the stroke simulator SM, and the master piston MP is slidably received in the housing HS in front of the stroke simulator SM, to form a master pressure chamber C1 in front of the master piston MP, which is communicated with the wheel brake cylinder WC through the switching valve NO as described above. In the master pressure chamber C1, there is disposed a return spring (compression spring) R1 for urging the master piston MP rearward, with its biasing force. In the housing HS, the master piston MP is fluid-tightly and slidably supported by seal members S1 and S2 having a cup-like sectional configuration, respectively. According to the present embodiment, the master piston MP is formed with land portions at its opposite end portions, each of which has an annular groove, in which each of the seal members S1 and S2 is held, respectively. In an annular space between the inner peripheral surface of the housing HS and the outer peripheral surface of the intermediate portion of the master piston MP, an atmospheric pressure chamber C2 is defined between the seal members S1 and S2, and communicated with the reservoir RS through a port P2. Although the cylinder housing HS and simulator housing SH are illustrated as one body in FIGS. 1 and 3 to be understood easily, it is formed with a plurality of cylindrical members assembled together in practice.

As shown in FIG. 1, the housing HS is formed with ports P1 and P2. When the master piston MP is placed in its initial position, the master pressure chamber C1 is communicated with the reservoir RS through the port P1. When the master piston MP is advanced by a predetermined stroke from the initial position or more, the opening end of the port P1 is closed by the seal member S1, so that the communication between the master pressure chamber C1 and the reservoir RS is blocked. The atmospheric pressure chamber C2 is always communicated with the reservoir RS, through the port P2.

Hereinafter, explained is the overall operation of the hydraulic brake system having the stroke simulator SM and master cylinder MC as constituted above. If the brake pedal BP is depressed, the braking operation force is transmitted to the master piston MP through the stroke simulator SM, and the master piston MP is advanced against the biasing force of the return spring R1. When the master piston MP is advanced by the predetermined stroke, the port P1 is closed by the seal member S1, so that the communication between the master pressure chamber C1 and the reservoir RS is blocked. If the brake pedal BP is depressed further, therefore, the hydraulic pressure is generated in the master pressure chamber C1 in response to the braking operation force. In this case, therefore, its stroke is detected by the stroke sensor BS, and the hydraulic pressure discharged from the master cylinder MC is detected by the pressure sensor Smc. When these detected signals are fed to the electronic control unit ECU, the switching valve NO is energized to be placed in its closed position, so that the communication between the master pressure chamber C1 and the wheel brake cylinder WC is blocked. In the electronic control unit ECU, a desired (target) wheel cylinder pressure is calculated on the basis of the detected stroke of the brake pedal BP and the detected hydraulic pressure discharged from the master cylinder MC. Then, the electric current fed to the first and second linear solenoid valves SV1 and SV2 respectively is controlled, so that the wheel cylinder pressure detected by the pressure sensor Swc equals the desired wheel cylinder pressure. Consequently, the hydraulic pressure regulated by the pressure control device PC in response to operation of the brake pedal BP is supplied to the wheel brake cylinder WC.

On the contrary, in the case where the pressure control device PC including the pressure source PG and the like comes to be abnormal, the switching valve NO is de-energized (turned off) to be placed in its open position, so that the master pressure chamber C1 and the wheel brake cylinder WC are communicated with each other, as shown in FIG. 1. At the same time, the first and second linear solenoid valves SV1 and SV2 are de-energized (turned off) to be placed in their closed positions, respectively, so that the hydraulic pressure is not supplied from the pressure source PG to the wheel brake cylinder WC. In this state, therefore, when the brake pedal BP is depressed, the hydraulic pressure generated in response to the braking operation force is supplied from the master cylinder MC to the wheel brake cylinder WC. Consequently, the braking operation force is maintained, even if the pressure control device PC came to be abnormal.

Next, the stroke simulator SM of the present embodiment operates as follows. When the brake pedal BP is depressed, and then the braking operation force applied to the simulator piston SP comes to be equal to or more than the initial load applied to the first elastic member E1 and second elastic member E2, they are compressed to provide a stroke of the simulator piston SP in response to the braking operation force. In this case, the spring constant of the stroke simulator SM equals to a composite spring constant of the spring constant of the first elastic member E1 and the spring constant of the second elastic member E2. As the spring constant of the second elastic member E2 has been set to be smaller than the spring constant of the first elastic member E1, the second elastic member E2 is compressed more than the first elastic member E1. When the brake pedal BP is depressed further to such an extent that the second elastic member E2 is compressed until the floating piston FP abuts on the bottom of the simulator housing SH, the second elastic member E2 will not be compressed further, so that only the first elastic member E1 will be compressed. As a result, the spring constant of the stroke simulator SM comes to be equal to the spring constant of the first elastic member E1, and therefore, it comes to be larger than the spring constant before the floating piston FP abuts on the bottom of the simulator housing SH.

Figure 5:
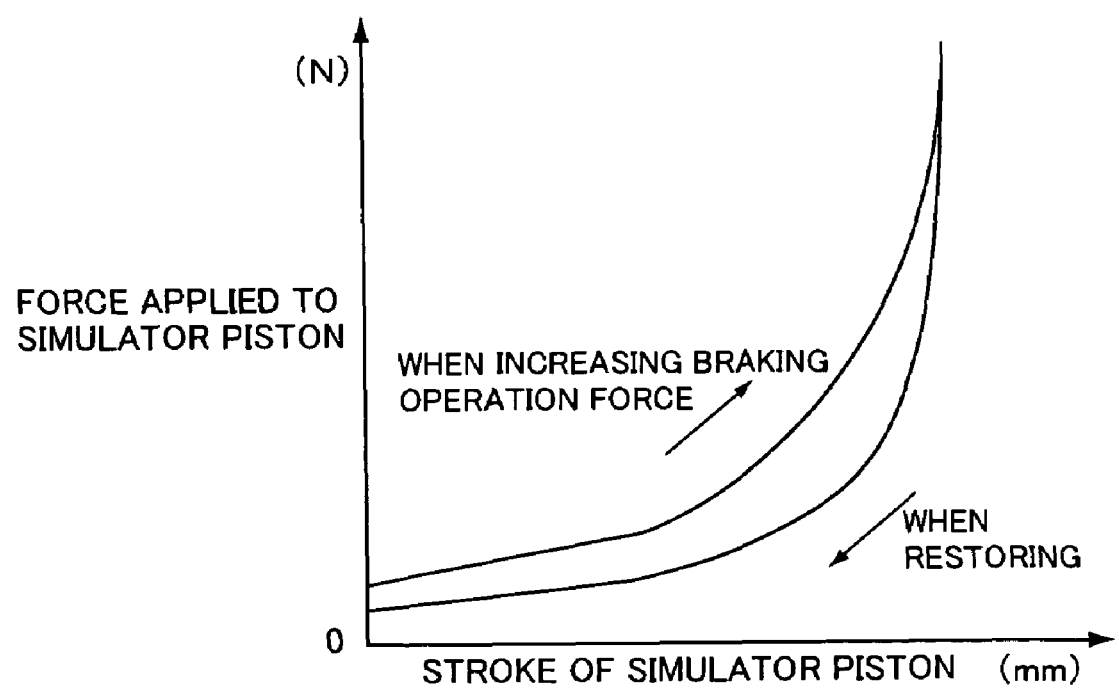
FIG. 5 is a diagram showing a relationship between force applied to a simulator piston and a stroke thereof according to a braking stroke simulator of the present invention.

When the brake pedal BP is depressed further, the first elastic member E1 made of rubber gradually contacts the inner peripheral surface of simulator piston SP, so that the portion to be compressed is shortened to enlarge its spring constant progressively. Consequently, the spring constant of the stroke simulator SM will be enlarged progressively. Thus, as the spring constant of the stroke simulator SM is progressively enlarged in response to operation of the brake pedal BP, there can be obtained such a proper brake pedal feeling property that the increasing amount of the stroke of brake pedal BP is reduced with the braking operation force increased. Especially, as the first elastic member E1 is compressed immediately after the stroke simulator SM begins to provide the stroke, hysteresis is caused due to deformation of the rubber of the first elastic member E1, to provide a hysteresis property as shown in FIG. 5, which shows the relationship between the force applied to the simulator piston (braking operation force) and the stroke of the simulator piston (stroke of the brake pedal BP). Even if dimensional variation or aged deterioration was caused with respect to the first elastic member E1 made of rubber, the influence on the initial load applied to the stroke simulator SM is very small, because it depends on the result of the composite spring constant of the spring constant of the first elastic member E1 and the spring constant of the second elastic member E2, multiplied by the amount of its dimensional variation or aged deterioration. Although the master cylinder MC is formed in front of the stroke simulator SM according to the present embodiment, it may be disposed between the stroke simulator SM and the brake pedal BP.

Figure 2:
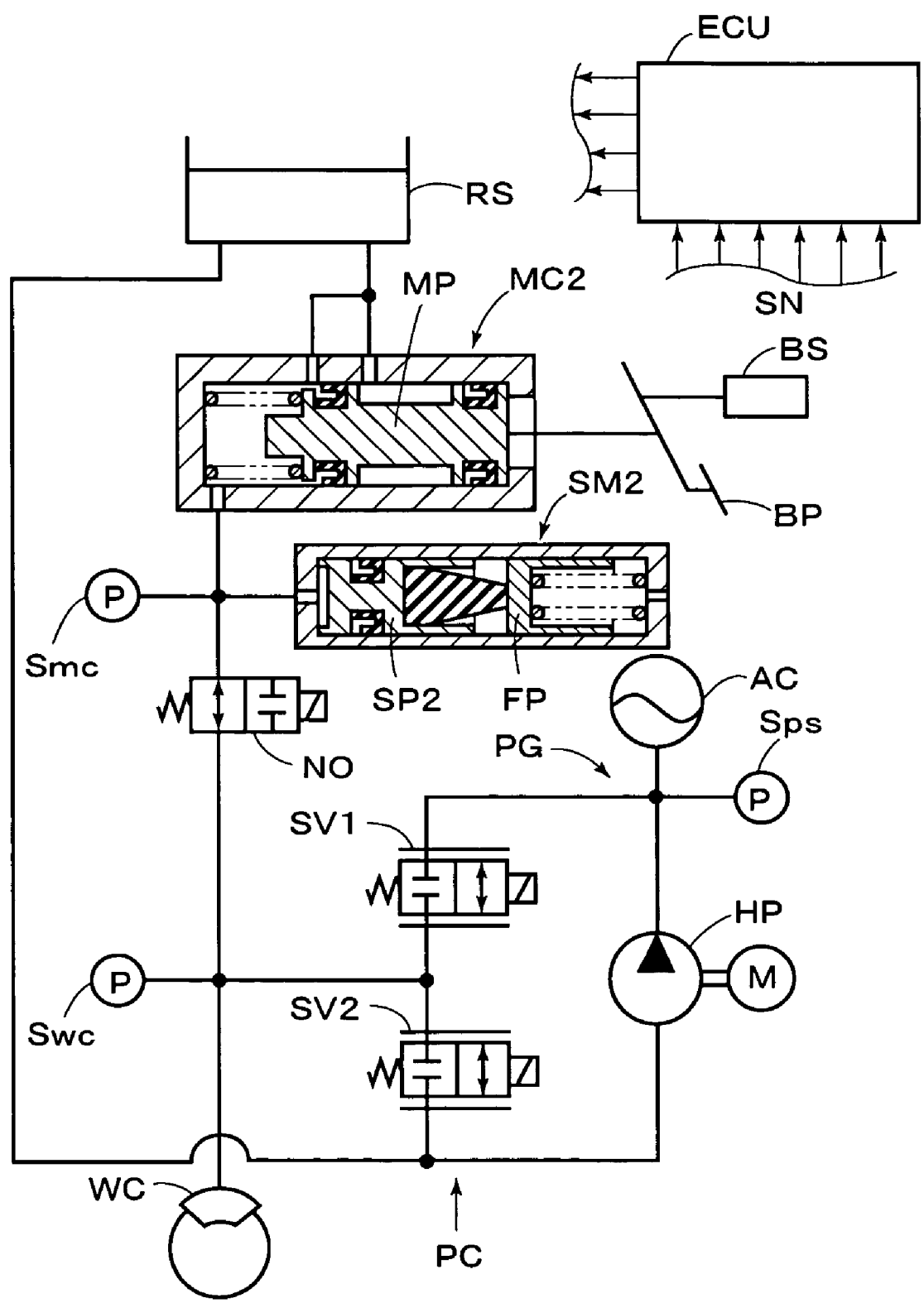
FIG. 2 is a schematic block diagram of a hydraulic brake system having a braking stroke simulator according to another embodiment of the present invention.
Figure 4:
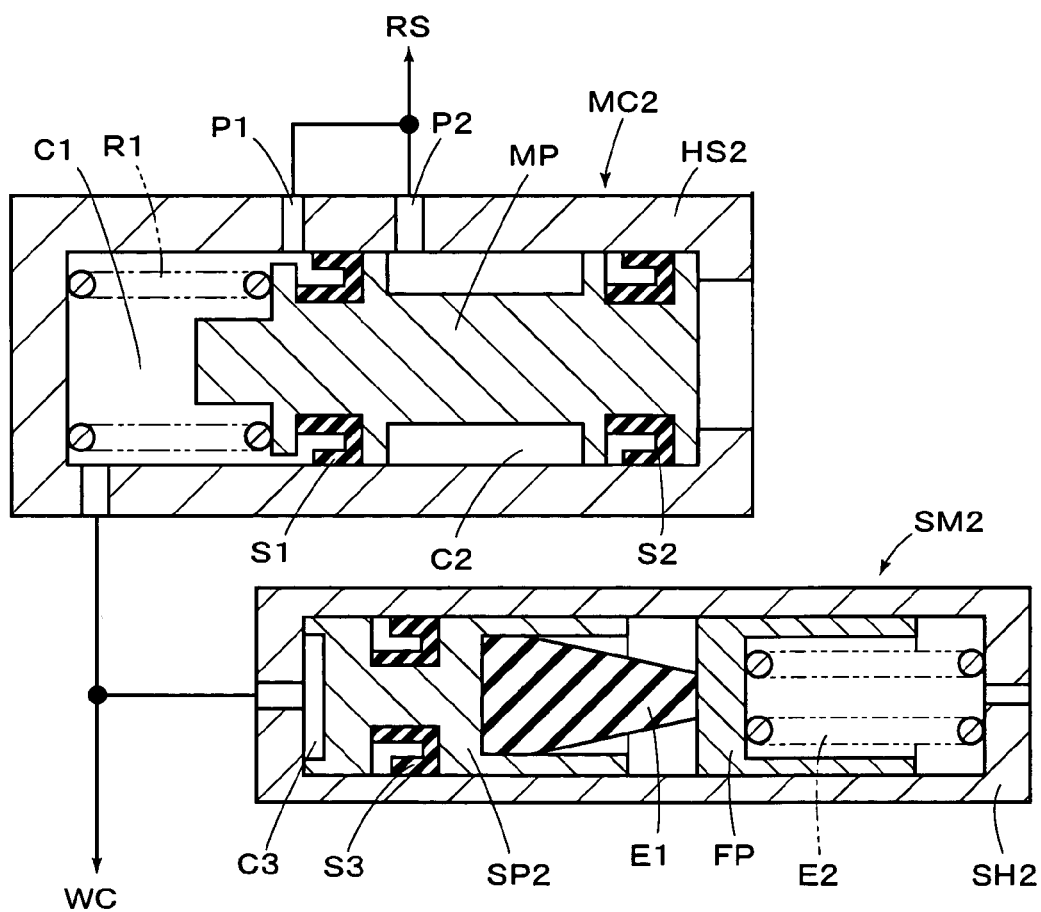
FIG. 4 is an enlarged sectional view of a master cylinder and a braking stroke simulator according to another embodiment of the present invention.

Next, another embodiment of the stroke simulator is explained referring to FIGS. 2 and 4, wherein structural elements equivalent to those described with respect to the stroke simulator SM in FIGS. 1 and 3 are designated by corresponding reference numerals. According to a stroke simulator SM2 of the present embodiment, it is formed separately from a master cylinder MC2, i.e., the simulator piston SP2 and floating piston FP are accommodated in a simulator housing SH2, and the master piston MP and return spring R1 are accommodated in a housing HS2. In front of the simulator piston SP2 in the simulator housing SH2, a simulator pressure chamber C3 is formed, and communicated with the master pressure chamber C1 of the master cylinder MC2. On the simulator piston SP2, therefore, a seal member S3 having a cup-like sectional configuration is disposed.

According to the embodiment as shown in FIGS. 2 and 4, therefore, the hydraulic pressure in the master pressure chamber C1 generated in response to the braking operation force is supplied to the simulator pressure chamber C3 of the stroke simulator SM2 to provide the stroke of the simulator piston SP2 in response to the hydraulic pressure in the simulator pressure chamber C3. As a result, the stroke of the master piston MP and consequently that of the brake pedal BP can be provided in response to the braking operation force.

With respect to the hydraulic pressure chamber of the present invention, the master pressure chamber C1 of the master cylinder MC has been employed in the present embodiment, as shown in FIG. 4. Alternatively, as for the hydraulic pressure chamber of the present invention, may be employed a special pressure chamber for supplying the hydraulic pressure to the simulator pressure chamber C3 of the stroke simulator SM2, to form the master cylinder MC in front of the special pressure chamber. Or, the master cylinder MC may be formed between the special pressure chamber and the brake pedal BP. Instead of the first and second linear solenoid valves SV1 and SV2, the pressure control device PC may be provided with a pressure regulator valve (not shown) for regulating the hydraulic pressure supplied from the pressure source PG in response to braking operation without using the electric control to discharge the hydraulic pressure.

Although the master cylinder MC was provided in the hydraulic brake system for use in each embodiment, the system may be constituted without any master cylinder, depending upon reliability of the pressure control device PC. The wheel brake cylinder WC is actuated by the hydraulic pressure supplied from the pressure control device PC in each embodiment. Instead, it may be so constituted that a wheel braking mechanism (not shown) is actuated by a motor (not shown). The manually operated braking member is not limited to the brake pedal BP, so that a manually operated braking lever (not shown) may be employed.

It should be apparent to one skilled in the art that the above-described embodiments are merely illustrative of but one of the many possible specific embodiments of the present invention. Numerous and various other arrangements can be readily devised by those skilled in the art without departing from the spirit and scope of the invention as defined in the following claims.

What is claimed is:

1. A braking stroke simulator operated in response to operation of a manually operated braking member for use in a brake system, comprising:
    a simulator piston moved in response to operation of said manually operated braking member; and
    elastic means for providing a stroke to said simulator piston in response to braking operation force applied to said manually operated braking member, wherein a restoring amount of said elastic means is restricted, so that an initial load applied to said elastic means is set and wherein said elastic means includes:
    a first elastic member comprising rubber and defining a first spring constant, said first elastic member being compressed immediately after the stroke simulator begins to provide the stroke, and said first elastic member being compressed with elastic deformation over the entire stroke of said simulator piston, and
    a second elastic member comprising a helical spring disposed in series with said first elastic member and defining a second spring constant less than the first spring constant, with the initial load applied to said first elastic member and the initial load applied to said second elastic member set to be equal to each other, wherein the stroke is provided to said simulator piston by said first elastic member and said second elastic member in response to the braking operation force applied to said manually operated braking member in an initial stroke thereof, and wherein the stroke is provided to said simulator piston only by said first elastic member in response to the braking operation force applied to said manually operated braking member in a stroke thereof following said initial stroke.

2. A braking stroke simulator as set forth in claim 1, wherein said brake system comprises pressure generating means provided with a piston moved in response to said manually operated braking member and a hydraulic pressure chamber defined in front of said piston for generating hydraulic pressure in said hydraulic pressure chamber to discharge the hydraulic pressure therefrom in response to the braking operation force applied to said manually operated braking member, said piston being moved in response to movement of said manually operated braking member, and wherein said elastic means provides the stroke to said simulator piston in response to the hydraulic pressure discharged from said pressure generating means, wherein the restoring amount of said first elastic member and the restoring amount of said second elastic member are restricted so that the initial load applied to said first elastic member and the initial load applied to said second elastic member are set, respectively.

3. A braking stroke simulator as set forth in claim 2, further comprising a housing in which is accommodated said first elastic member and said second elastic member, with a restoring amount of said first elastic member and said second elastic member each being restricted to set each initial load.

4. A braking stroke simulator as set forth in claim 3, wherein said second elastic member comprises a helical compression spring possessing a longitudinal axis that is aligned with a longitudinal axis of said first elastic member.

5. A braking stroke simulator as set forth in claim 3, further comprising a floating piston movably disposed in said housing between said first elastic member and said second elastic member for transmitting the braking operation force.

6. A braking stroke simulator as set forth in claim 2, wherein said pressure generating means is a master cylinder having a master piston moved in response to said manually operated braking member, and a master pressure chamber defined in front of said master piston for discharging the hydraulic pressure in response to the braking operation force applied to said manually operated braking member.

7. A braking stroke simulator as set forth in claim 1, further comprising a housing in which is accommodated said first elastic member and said second elastic member, wherein the restoring amount of said first elastic member and the restoring amount of said second elastic member are restricted, so that the initial load applied to said first elastic member and the initial load applied to said second elastic member are set, respectively.

8. A braking stroke simulator as set forth in claim 7, wherein said second elastic member comprises a helical compression spring possessing a longitudinal axis that is aligned with a longitudinal axis of said first elastic member.

9. A braking stroke simulator as set forth in claim 7, further comprising a floating piston movably disposed in said housing between said first elastic member and said second elastic member for transmitting the braking operation force.

10. A braking stroke simulator as set forth in claim 1, wherein the first elastic member is compressed with elastic deformation, so that a hysteresis is provided for a relationship between the force applied to the said simulator piston and the stroke of the simulator piston, throughout the entire stroke of the simulator piston.

11. A braking stroke simulator operated in response to operation of a manually operated braking member for use in a brake system, comprising:

a simulator piston moved in response to operation of said manually operated braking member;

elastic means for providing a stroke to said simulator piston in response to braking operation force applied to said manually operated braking member, wherein a restoring amount of said elastic means is restricted, so that an initial load applied to said elastic means is set and wherein said elastic means includes:

a first elastic member comprising rubber and defining a first spring constant, said first elastic member being compressed immediately after the stroke simulator begins to provide the stroke, and said first elastic member being compressed with elastic deformation over the entire stroke of said simulator piston, and a second elastic member comprising a helical spring disposed in series with said first elastic member and defining a second spring constant less than the first spring constant, with the initial load applied to said first elastic member and the initial load applied to said second elastic member set to be equal to each other, a housing in which is accommodated said first elastic member and said second elastic member; and a floating piston movably disposed in said housing between said first elastic member and said second elastic member;

wherein the stroke is provided to said simulator piston by said first elastic member and said second elastic member in response to the braking operation force applied to said manually operated braking member before said floating piston abuts on said housing, and wherein the stroke is provided to said simulator piston only by said first elastic member in response to the braking operation force applied to said manually operated braking member after said floating piston abuts on said housing.

12. A braking stroke simulator as set forth in claim 11, wherein said housing is a simulator housing, and further comprising a master piston and a return spring accommodated in another housing separate from said simulator housing, and a master pressure chamber defined between said master piston and one end of said another housing.

13. A braking stroke simulator as set forth in claim 12, further comprising a simulator pressure chamber defined between said simulator piston and one end of said simulator housing, said simulator pressure chamber communicating with said master pressure chamber.

14. A braking stroke simulator as set forth in claim 11, wherein said housing is a first housing positioned in a second housing, and further comprising a master cylinder piston slidably positioned in said second housing and a return spring positioned in the second housing and urging the master cylinder piston toward the first housing.

15. A braking stroke simulator as set forth in claim 14, further comprising a master pressure chamber in the second housing adapted to communicate with a wheel cylinder, said master pressure chamber being defined between said master cylinder piston and one end wall of said second housing.

16. A braking stroke simulator as set forth in claim 11, wherein said housing is a first housing positioned in a second housing, and further comprising a master cylinder piston positioned in the second housing.

17. A braking stroke simulator as set forth in claim 11, wherein said housing is a simulator housing, and further comprising a master piston slidably accommodated in another housing separate from said simulator housing.

* * * * *